United States Patent
Corven et al.

(10) Patent No.: US 6,810,932 B1
(45) Date of Patent: Nov. 2, 2004

(54) CAPLESS FLUID RESERVOIR

(75) Inventors: David Corven, Washington, MI (US); Grigory Yezersky, Farmington Hills, MI (US); Thomas S Moore, Oxford, MI (US); Gerald Cilibraise, Livonia, MI (US); Edmund Tworkowski, Rochester Hills, MI (US); William W Doolittle, III, Ann Arbor, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/666,164

(22) Filed: Sep. 18, 2003

(51) Int. Cl.[7] .................................................. B65B 1/04
(52) U.S. Cl. ...................... 141/346; 141/301; 220/86.2; 220/DIG. 33
(58) Field of Search ................................ 141/346, 351, 141/301, 286, 114; 220/86.1, 86.2, 213, 232, 378, DIG. 33

(56) References Cited

U.S. PATENT DOCUMENTS

| | | | | |
|---|---|---|---|---|
| 2,576,192 A | * | 11/1951 | Poznik | 220/86.2 |
| 4,798,306 A | * | 1/1989 | Giacomazzi et al. | 220/86.2 |
| 6,095,207 A | * | 8/2000 | Enders | 141/348 |
| 6,193,093 B1 | * | 2/2001 | Brunner | 220/234 |

* cited by examiner

Primary Examiner—Steven O. Douglas
(74) Attorney, Agent, or Firm—Ralph E. Smith

(57) ABSTRACT

A seal within the filler neck of a fluid reservoir is configured to provide fluid channels into the reservoir while in the at-rest position, but seals the filler neck when deformed by an externally directed insert in the filler neck. The seal is a hollow bulb with a frusto-conical surface spaced from a parallel frusto-conical surface of the filler neck by a plurality of ribs therebetween. The gap between the ribs, and between the surfaces of the seal and the filler neck, from fluid channels for replenishing the reservoir. A plunger inserted into the filler neck deflects the seal outwardly into contact with the filler neck, closing the fluid channels and preventing matter from entering the fluid reservoir.

18 Claims, 1 Drawing Sheet

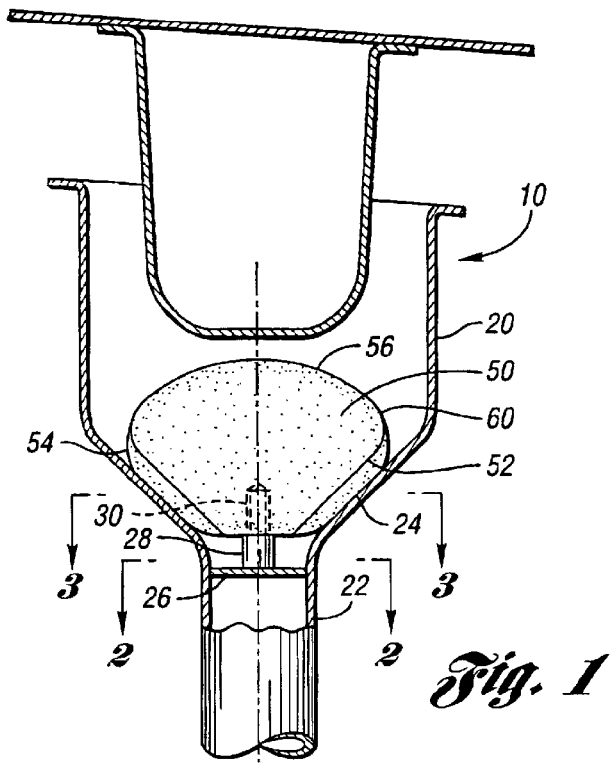
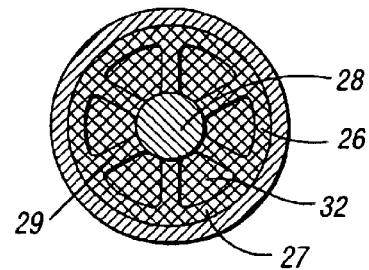
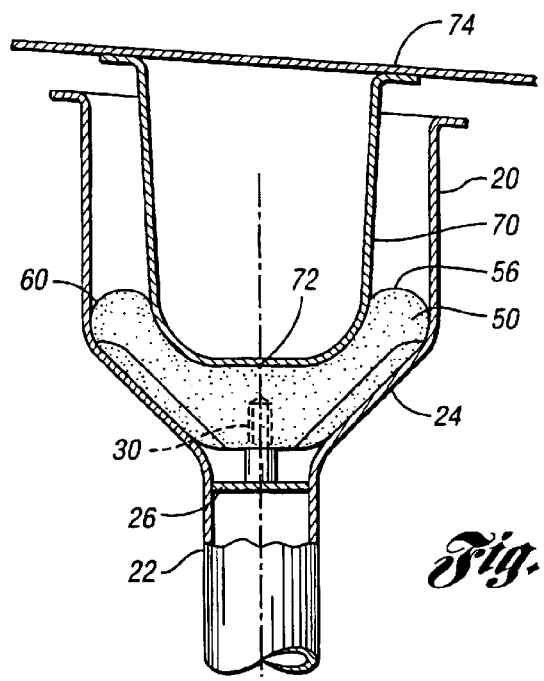
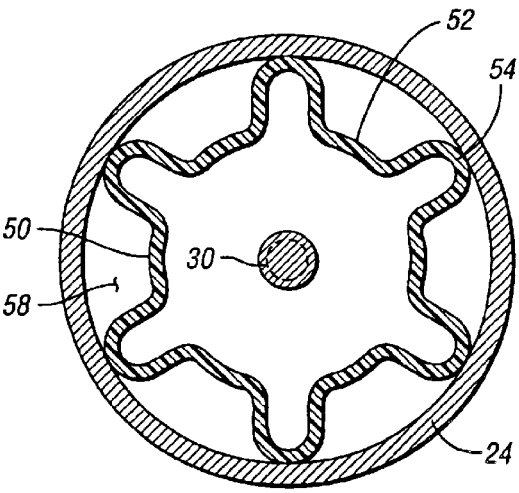

US 6,810,932 B1

CAPLESS FLUID RESERVOIR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to a seal for a fluid reservoir. In one of its aspects, the invention relates to a fluid reservoir within a larger receptacle, the seal operable with a cover of the larger receptacle.

2. Description of Related Art

In automobiles, particularly automobile engine compartments, certain fluid reservoirs are found. These can include a windshield washer fluid reservoir and a coolant overflow/reservoir. These fluid reservoirs are unpressurized and are generally formed of a blow-molded plastic material, including a short filler neck covered by a friction- or snap-fit cap. The cap prevents debris from entering the reservoir, and is removable for a vehicle operator to add fluid to the reservoir as needed. The cap is often tethered to the reservoir, but the tether can break, or can bias the cap over the fill opening while the user is attempting to replenish the fluid.

It would be advantageous to provide a fill opening of a fluid reservoir capable of preventing unwanted debris from entering the reservoir while in use, but readily accessible to a user when adding the desired fluid to the reservoir.

BRIEF SUMMARY OF THE INVENTION

A seal within the filler neck of a fluid reservoir is configured to provide fluid channels into the reservoir while in the at-rest position, but seals the filler neck when deformed by an externally directed insert in the filler neck.

In one embodiment, the seal is a hollow bulb with a frusto-conical surface spaced from a parallel frusto-conical surface of the filler neck by a plurality of ribs therebetween. The gap between the ribs, and between the surfaces of the seal and the filler neck, form fluid channels for replenishing the reservoir. A plunger inserted into the filler neck deflects the seal outwardly into contact with the filler neck, closing the fluid channels and preventing matter from entering the fluid reservoir.

BRIEF DESCRIPTION OF THE SEVERAL VIEWS OF THE DRAWINGS

The present invention will become more fully understood from the detailed description and the accompanying drawings, wherein:

FIG. 1 is a cross-sectional view of a filler neck for a fluid reservoir according to the invention, in an unsealed condition.

FIG. 2 is a cross-sectional view taken through line 2—2 of FIG. 1.

FIG. 3 is a cross-sectional view taken through line 3—3 of FIG. 1.

FIG. 4 is a cross-sectional view of the filler neck of FIG. 1, in a sealed condition.

DETAILED DESCRIPTION OF THE INVENTION

Referring to FIG. 1, a filler neck assembly 10 includes a tubular section 22 fluidly connected to a fluid reservoir (not shown), and to a filler neck opening in the form of an open cylindrical receptacle 20. The open cylindrical receptacle 20 is connected to the tubular section 22 by an inwardly tapering frusto-conical section 24. Proximate the junction of the receptacle 20 and the tubular section 22, a wheel spoke frame 26 is fixedly mounted across the opening of the tubular section 22.

With reference to FIGS. 2–3, the frame 26 is formed of a center hub 30, a perimeter rim 27, and radially extending spokes 29 suspending the hub 28 substantially centered within the tubular section 22. Gaps formed between the spokes fluidly connect the receptacle 20 with the tubular section 22. An upwardly/outwardly projecting stud 30 projects from the hub 28 into the center of the receptacle 20. The frame 26 supports a mesh screen 32 substantially covering the whole of the opening of the tubular section 22.

Referring again to FIG. 1, stud 30 extends upwardly from the hub 28 of the wheel spoke frame 26 and is serrated. The stud 30 projects into the cylindrical receptacle 20 and is adapted to mount a resilient seal 50 in the frusto-conical section 24 between the cylindrical receptacle 20 and the tubular section 22.

The resilient seal 50 comprises a substantially frusto-conical main section 52, a spherical upper face 56, and a number of radial ribs 54 projecting from the face of the frusto-conical section 52. The outer face of the frusto-conical main section 52 is formed having a similar profile to the frusto-conical section 24 so that with the seal 50 mounted on the stud 30, the face of the seal frusto-conical main section 52 and the wall of the frusto-conical section 24 of the receptacle 20 are substantially parallel. The radial ribs 54 projecting from the face of the seal 50 contact the wall of the frusto-conical section 24 to center the seal therein and maintain a uniform gap and form fluid passages 58 (see FIG. 3) between the seal 50 and the frusto-conical section 24, and between neighboring radial ribs 54. The ribs 54 are further arcuate in cross-section, as shown in FIG. 1, and taper into a continuous curve with the spherical portion 56 of the seal 50. It is further anticipated that the ribs 54 can be, in the alternative, molded into the frusto-conical section 24 to center the seal 50.

Referring now to FIG. 4, the seal 50 is adaptable to deform and seal the tubular section 22 from the cylindrical section 20. To accomplish this, a substantially cylindrical plunger 70 is inserted centrally into the cylindrical receptacle 20. The face 72 of the plunger 70 contacts the spherical face 56 of the resilient seal 50 and displaces it towards the frusto-conical section 24.

As the spherical face 56 is flattened and displaced by the plunger 70, the periphery 60 of the seal 50 is displaced outwardly. The ribs 54 taper in towards the periphery 60 of the spherical face 56 until, at the periphery 60, the seal 50 forms a uniform circular section. As the seal 50 is displaced outwardly, this circular periphery 60 of the seal 50 contacts and conforms to the wall of the frusto-conical section 24 and/or the cylindrical receptacle 20, forming a fluid-tight seal. In a configuration wherein the ribs are formed on the frusto-conical section 24, the periphery 60 would form a seal with the wall of the frusto-conical section 24 above the ribs.

When the plunger 70 is removed, the resilient seal 50 rebounds to its original shape, with fluid channels 58 again formed between the seal 50 and the wall of the frusto-conical section 24, and between the periphery 60 and the cylindrical section 20. In one exemplary embodiment of the invention, the plunger 70 is affixed to an underside of the vehicle hood 74, so that when the hood is opened, the fluid filler assembly 10 is readily accessible with no further action on the part of the user. The cylindrical section 20 is further amenable to receive the neck of an inverted fluid container, for unattended replenishment of the fluid reservoir.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A fluid reservoir having a filler opening, wherein the filler opening comprises a receptacle section having a first diameter and a base section having a second diameter smaller than the first diameter, a seal fixedly mounted relative to the base section, the seal defining a cavity therein and having an upper surface, and a plunger longitudinally displaceable within the filler opening from an open position to a closed position, whereby the plunger in the closed position contacts the upper surface of the seal and displaces the seal to sealingly contact the base section of the filler opening.

2. The fluid reservoir of claim 1, wherein the base section includes a tapered portion and the seal sealingly contacts the tapered portion of the base section.

3. The fluid reservoir of claim 2, wherein the seal further includes a tapered surface adapted for mounting substantially parallel to the tapered portion of the base section.

4. The fluid reservoir of claim 3, wherein the seal further comprises at least one radially extending rib for spacing the seal from the base section.

5. The fluid reservoir of claim 3, further comprising a plurality of radially directed ribs for uniformly spacing the tapered surface of the seal from the tapered portion of the base section.

6. The fluid reservoir of claim 5, wherein the plurality of radially directed ribs project outwardly from the tapered surface of the seal.

7. The fluid reservoir of claim 5, wherein the plurality of radially directed ribs project inwardly from the tapered surface of the base section.

8. A capless filler neck assembly for a fluid reservoir, the assembly including:
    a filler neck comprising:
        an open cylindrical receptacle having a first diameter;
        a frusto-conical segment tapering from the first diameter to a second diameter and contiguous with the cylindrical receptacle; and
        a tube having a second diameter and adapted to fluidly connect the frusto-conical segment to the fluid reservoir;
    a resilient sealing element fixedly mounted within the filler neck and including a frusto-conical surface adapted for placement within the frusto-conical segment of the filler neck and a spherical surface; and
    a remotely mounted plunger adapted for insertion into the open cylindrical receptacle, whereby upon insertion into the open cylindrical receptacle, the plunger contacts the spherical surface of the resilient sealing element, causing the resilient sealing element to deflect outwardly and into sealing contact with an inner wall of the filler neck, fluidly isolating the open cylindrical receptacle from the tube.

9. The assembly of claim 8, wherein the plunger is adapted for remotely mounting to an inner surface of an automobile hood.

10. The assembly of claim 8, wherein the resilient sealing element further comprises radially extending ribs for centering the sealing element within the filler neck.

11. A sealing assembly for a fluid conduit including a first section, a second section, and an intermediate section fluidly connecting the first and second sections, the sealing assembly comprising:
    a resilient member fixedly positioned within the fluid conduit and including a contact surface and a sealing surface, the resilient member configured to present a passage through the fluid conduit in a resting position and to block the fluid conduit in a sealing position, the sealing surface adapted to deflect toward a wall of the fluid conduit when the contact surface is deflected longitudinally into the fluid conduit; and
    an actuation member for insertion into the fluid conduit to an extent to move the resilient member to a sealing position by deflecting the contact surface longitudinally into the fluid conduit to an extent that the sealing surface is deflected outwardly into sealing contact with the wall of the fluid conduit,
    wherein upon removal of the actuation member, the resilient member returns to the resting position.

12. The sealing assembly of claim 11, wherein the resilient member is fixedly positioned in the intermediate section.

13. The sealing assembly of claim 12, wherein the first section has a first diameter, the second section has a second diameter smaller than the first diameter, and the intermediate section reduces the first diameter to the second diameter.

14. The sealing assembly of claim 13, wherein the intermediate section is tapered from the first diameter to the second diameter.

15. The sealing assembly of claim 14, wherein the intermediate section is frusto-conical in configuration.

16. The sealing assembly of claim 11, wherein the first section has a first diameter, the second section has a second diameter smaller than the first diameter, and the intermediate section reduces the first diameter to the second diameter.

17. The sealing assembly of claim 16, wherein the intermediate section is tapered from the first diameter to the second diameter.

18. The sealing assembly of claim 17, wherein the intermediate section is frusto-conical in configuration.

* * * * *